Karl F. Ross
INVENTOR.

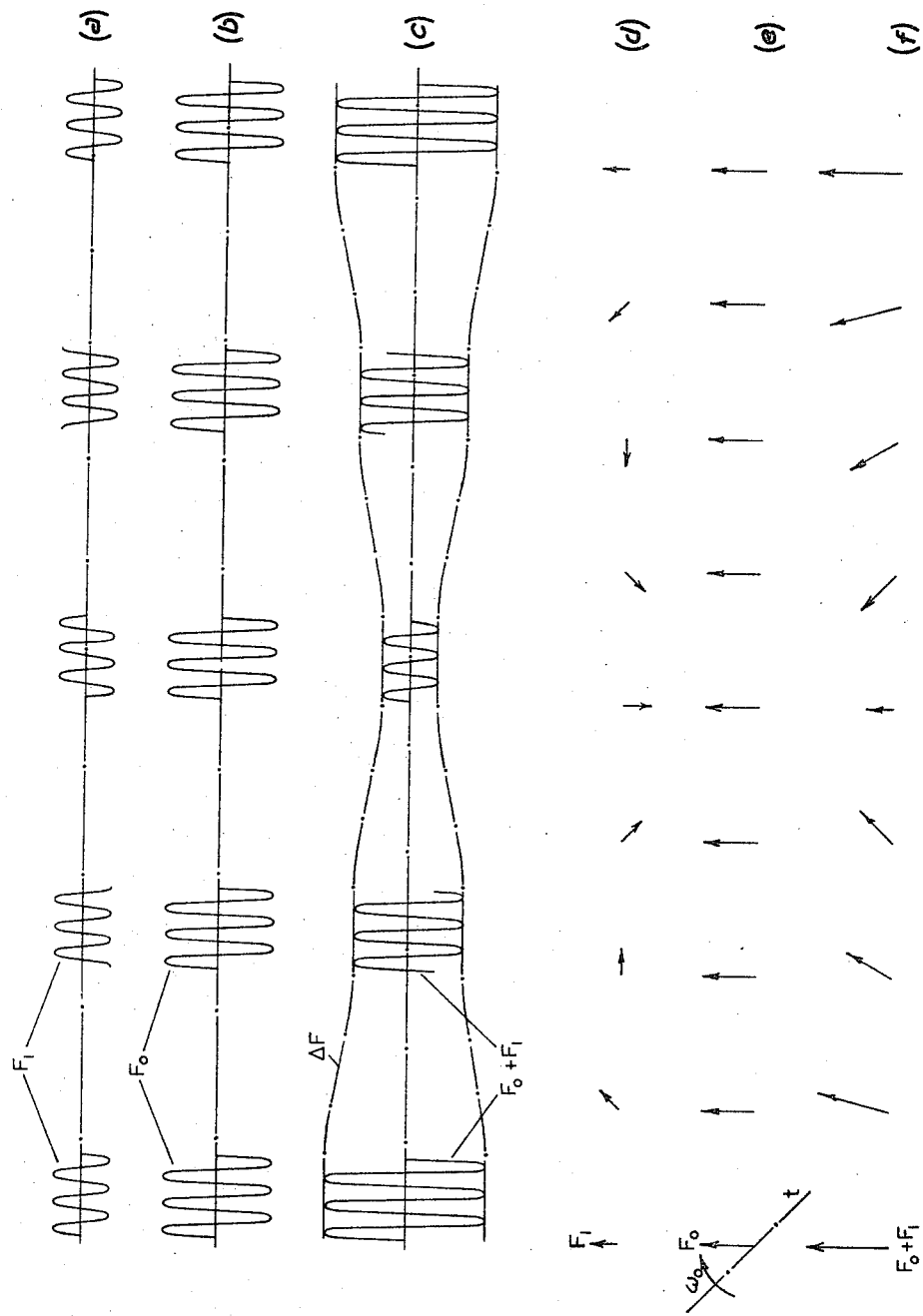

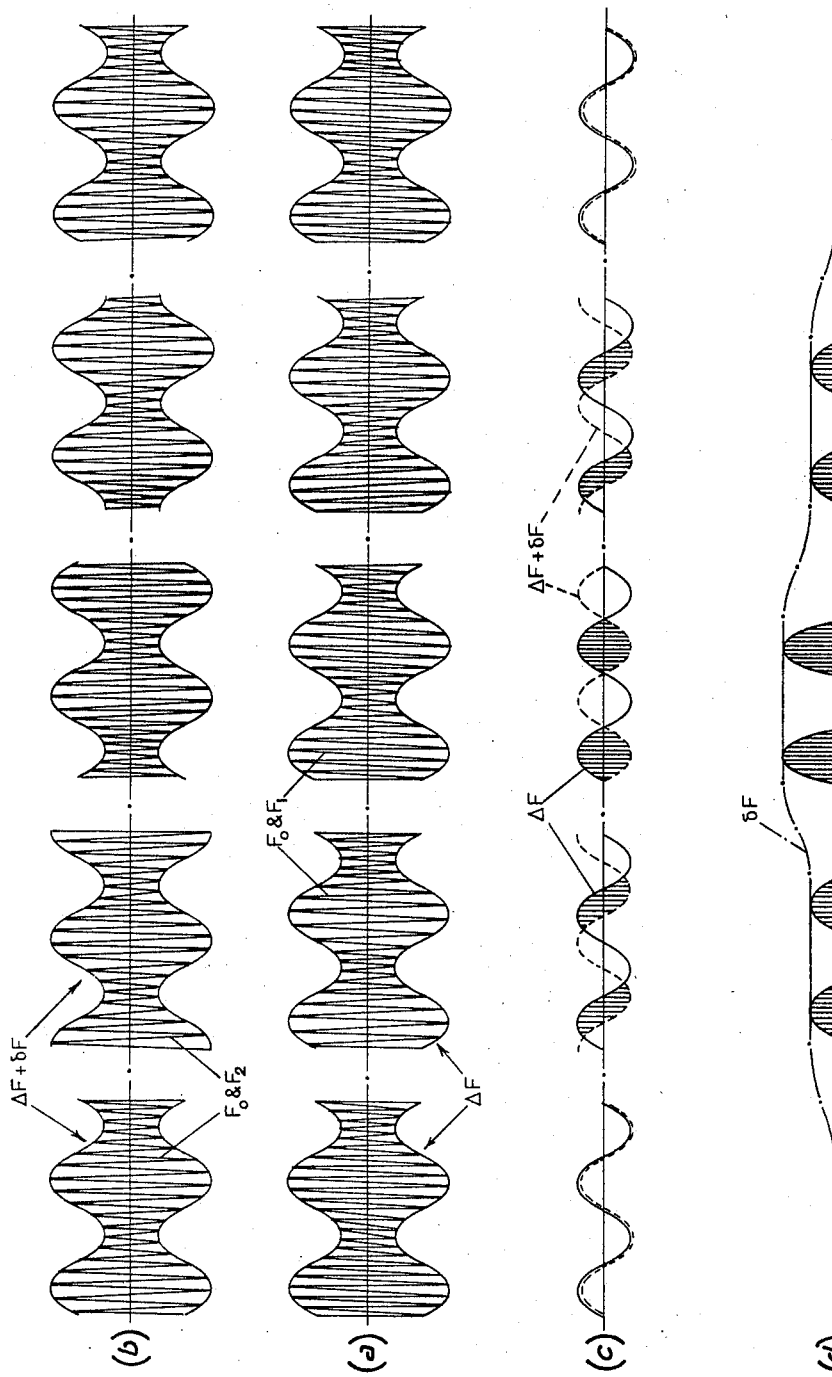

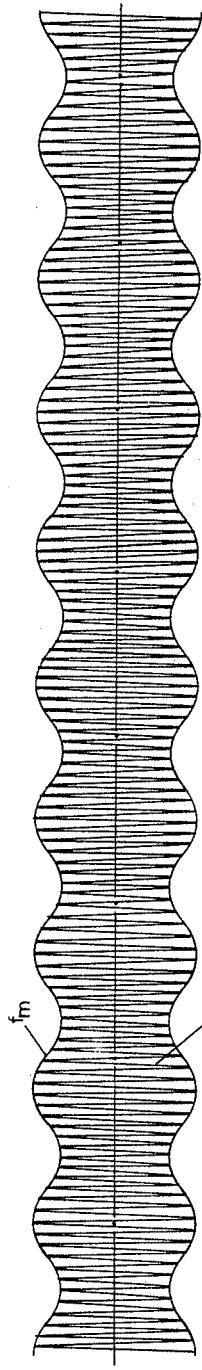
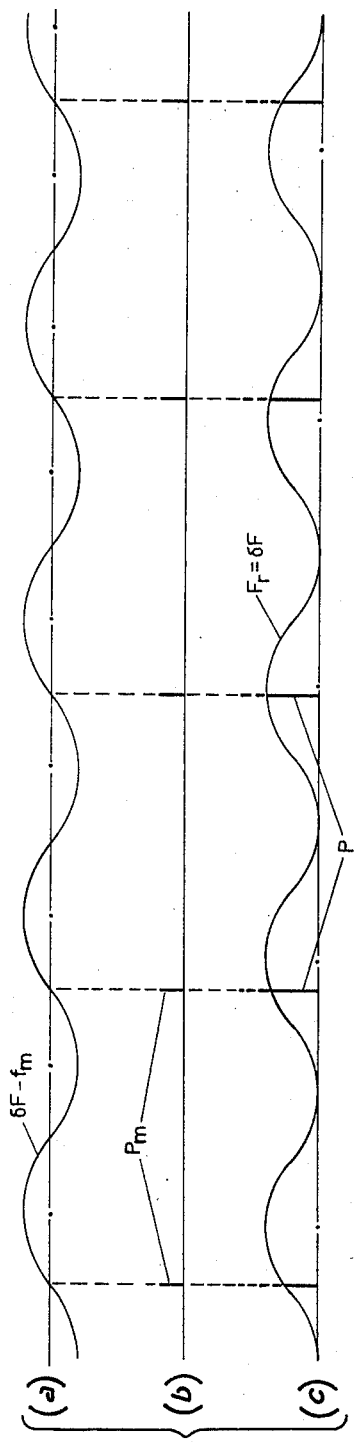
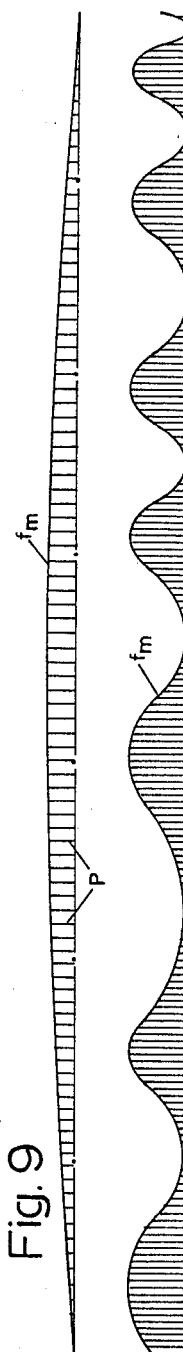
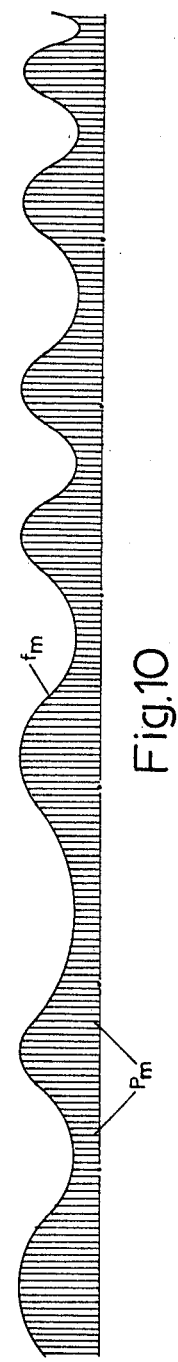
Fig.7  Fig.8 (a)(b)(c)  Fig.9  Fig.10

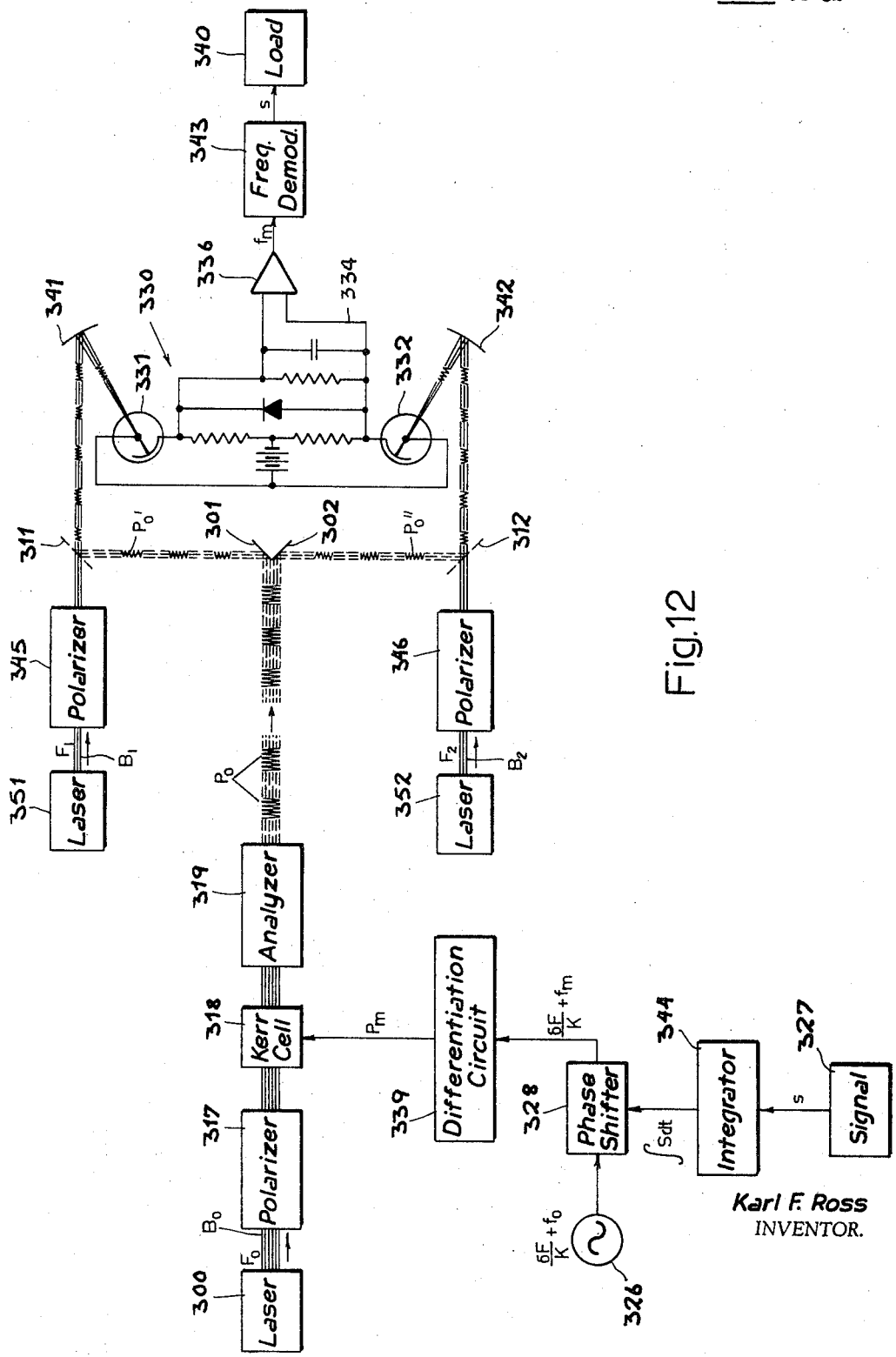

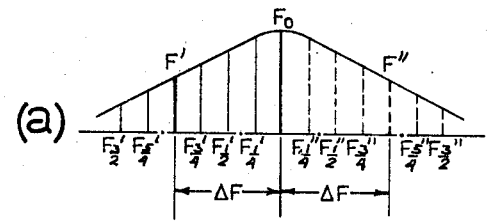
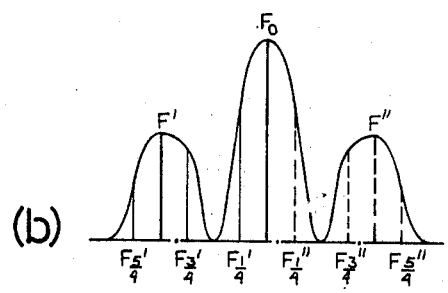
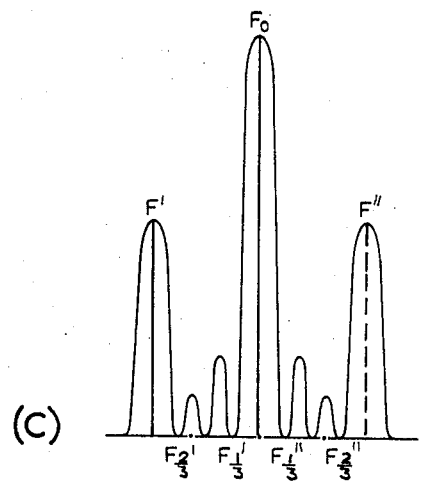
Fig.15
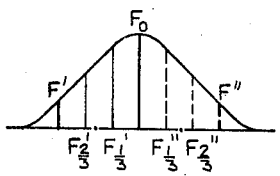
Fig.16
Karl F. Ross
INVENTOR.

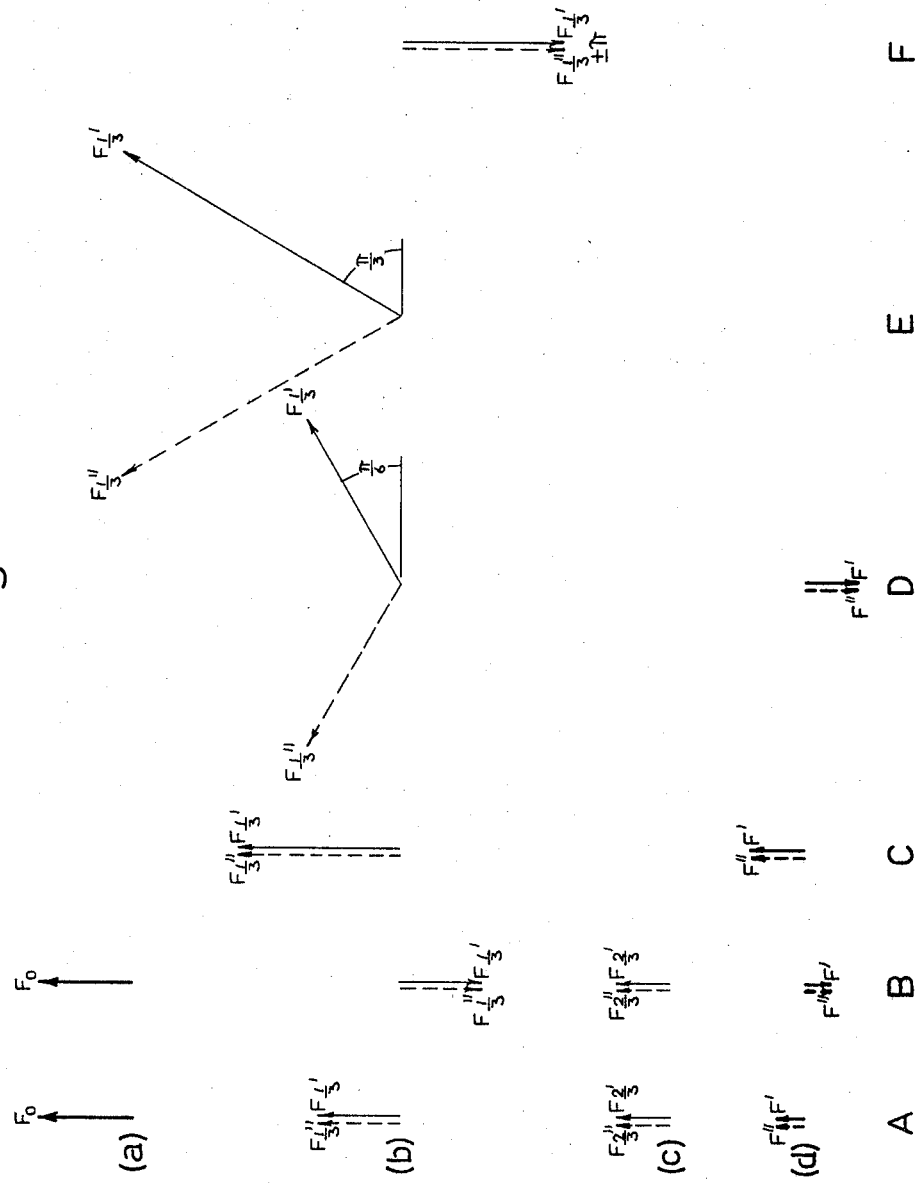

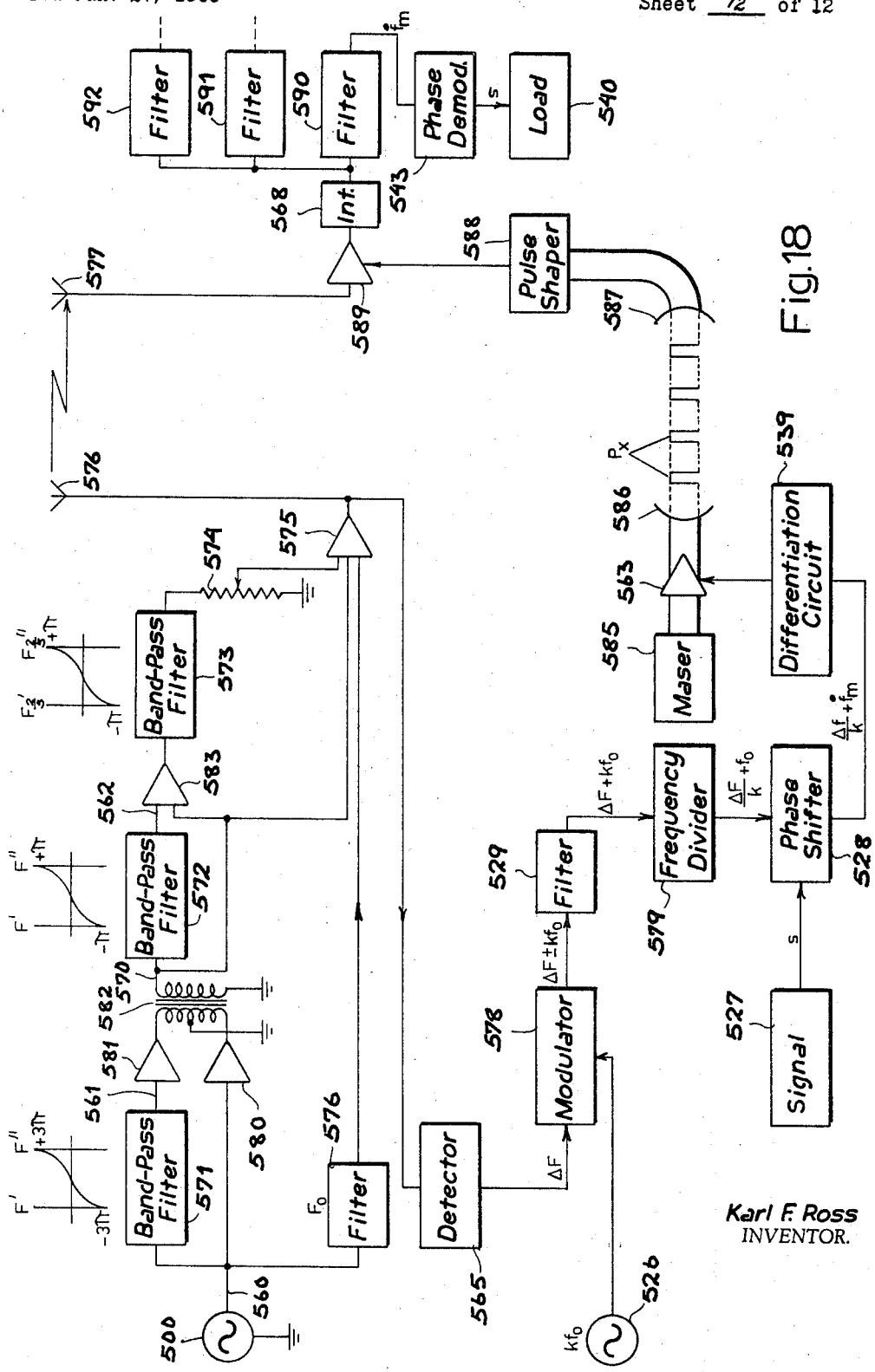

3,428,810
MODULATION AND DEMODULATION OF HIGH-FREQUENCY RADIATION
Karl F. Ross, 5121 Post Road, New York, N.Y. 10471
Filed Jan. 27, 1965, Ser. No. 428,498
U.S. Cl. 250—199    20 Claims
Int. Cl. H04b 9/00

ABSTRACT OF THE DISCLOSURE

Two high-frequency oscillations—one of fixed frequency $F_r$, the other of variable frequency $F_r+f_m$ where $f_m$ is a small fraction of $F_r$—are compared by deriving a train of control pulses from one oscillation and sampling the other oscillation in step with these control pulses to produce a train of amplitude-modulated output pulses from which it is possible to reconstitute a modulating signal represented by the frequency excursions of $f_m$. The fixed-frequency reference oscillation $F_r$ may be the beat frequency of two concurrently transmitted waves of still higher frequencies; with transmission of wave energy at extremely high frequencies (e.g. via laser beams), cascading of beats may be used to establish first a pair of primary difference frequencies $\Delta F$, $\Delta F+\delta F$, the secondary difference frequency $\delta F$ thereof constituting the reference oscillation $F_r$.

---

My present invention relates to the modulation and demodulation of electromagnetic waves, especially waves of very short length such as those generated by masers and lasers. The principles herein disclosed are, however, also applicable to oscillations of lower frequency as an alternative to conventional modulating and demodulating procedures.

As far as I am aware, no effective system has as yet been devised for utilizing even a fraction of the range of signal frequencies potentially available through the modulation of beams of extremely short wavelength, e.g. those produced by optical masers or lasers. Thus, only a low-frequency pulsing of such beams has hitherto been employed for the purpose of conveying information.

It is, therefore, an important object of my present invention to provide means for selectively varying not only the timing but also the amplitude of high-frequency carrier bursts, such as those constituted by a pulsed laser beam, in order to facilitate integration of these bursts at a receiver into a signal-modulated subcarrier of transmitted information.

In its boarder aspects, the invention resides in the generation of a high-frequency oscillation $F_r+f_m$, hereinafter referred to as "pacemaker," where $F_r$ is a fixed reference frequency and $f_m$ (which may be taken with positive or negative sign) is a signal-modulated intermediate frequency with a mean value $f_0\ll F_r$, one of the two high-frequency oscillations $F_r$ and $F_r+f_m$ being converted into a train of time-modulated control pulses, the other oscillation being sampled in the rhythm of these time-modulated pulses so as to produce a train of signal pulses whose amplitude varies at the rate $f_m$ whereby the subcarrier may be reconstituted by an integration of these latter pulses. Depending on whether the sampling of the reference wave takes place at a transmitting station or at a receiving station, either the control pulses or the signal pulses are transmitted by direct radiation or some other suitable channel from the former station to the latter in order to communicate the information sought to be conveyed; in special cases it may also be desirable to transmit merely the modulated pacemaker oscillation and to differentiate it at the receiving station for generating the control pulses. The term "pacemaker" is suggestive of the fact that the variable frequency oscillation $F_r+f_m$ establishes, upon comparison with the fixed-frequency reference oscillation $F_r$, a progressively increasing time lag (or lead) whose rate of change represents the signal to be transmitted.

The ratio $R=F_r/f_0$ of the reference and subcarrier frequencies may be very large, e.g. 100 or more, so that the frequency difference between the pacemaker and reference oscillations will be commensurately small (e.g. 1% or less). A very small shift in the frequency of the pacemaker oscillation will therefore create a change R times as large in the magnitude of the frequency component $f_m$ from which the original signal is reproduced by demodulation of the reconstituted subcarrier. Thus, if only the pacemaker wave or its derivative control pulses are transmitted, demodulation becomes virtually impossible in the absence of a reference oscillation of proper frequency whereby the secrecy of communication is increased. It is, accordingly, a further object of my invention to provide message-transmitting means in a communication system designed to conceal the conveyed information from any unauthorized receiver.

A more particular feature of my invention involves the concurrent generation of two or more monochromatic beams of closely spaced frequencies trained upon a common receiver so as to produce beats at a difference frequency low enough to be electronically transmissible by conventional circuitry, at least one of the constituent beams being pulsed at a variable rate but with a mean cadence slightly offset from the aforementioned difference frequency (or, if desired, from some aliquot part thereof) whereby successive pulses differ in amplitude in conformity with the deviation of the pulse rate from the difference frequency or its nearest submultiple. Again, the deviation of the mean cadence from the difference frequency is a small fraction $1/R$ of the latter frequency and represents the cadence of a subcarrier which, upon being frequency-modulated by a signal to be transmitted, determines the variable pulse spacing.

Where the carrier frequency of the pulsed radiation is extremely high, as in the case of an optical maser or laser beam, it may be necessary to create secondary interference between two beat frequencies at the receiver in order to convert the incident optical pulses into distinct electronic pulses of varying amplitude. This may be accomplished, in accordance with a further feature of my invention, by the concurrent generation of two pairs of monochromatic beams with closely spaced frequencies, specifically by linear superposition of a principal beam of frequency $F_0$ upon a first auxiliary beam of frequency $F_1$ and, separately, upon a second auxiliary beam of frequency $F_2$, with $|F_0-F_1|=\Delta F$ and $|F_0-F_2|=\Delta F+\delta F$ where $\Delta F\ll F_0$ and $\delta F\ll\Delta F$, $\delta F$ being of either sign. Thus, if two laser beams differing in frequency by $\Delta F$ are trained upon one photocell and laser beams differing in frequency by $\Delta F+\delta F$ are trained upon another photocell sharing a common output circuit with the first cell, a suitable detector in this output circuit will develop an electronic wave of frequency $\delta F$.

If one or more of the incident beams are pulsed in the manner described above, this wave of frequency $\delta F$ will be discontinuous and will take the form of short pulses of varying amplitude which, when integrated, define a modulated subcarrier of frequency $f_m\ll\delta F$.

The system just outlined presupposes the existence of sharply monochromatic beams since the minimum separation of interfering beat frequencies will depend upon the narrowness of the frequency band of each beam. For radiation frequencies within the optical range it is possible to isolate particular monochromatic fluxes with the aid of conventional multislit spectrometers, e.g. as described by Marcel J. E. Golay in volume 39, No. 6 and volume 41, No. 7 of "Journal of the Optical Society of America" or more recently by André Jean Girard in "Optica Acta," volume 7, No. 1, An International Journal of Theoretical and Applied Optics published by Taylor and Francis Ltd. of London, England. For carrier waves of somewhat greater wavelength, e.g. in the millimeter and centimeter range, this method is unavailable and conventional impedance-type filters may not offer a sufficiently sharp cutoff. It is, therefore, an ancillary object of my invention to provide means for isolating selected frequencies in a broad-spectrum beam of electromagnetic radiation not susceptible to diffraction or dispersion by optical means.

The latter object of my invention is realized by splitting a broad-spectrum wave into two separate oscillations and by subjecting these oscillations to a progressive relative phase shift of their individual frequencies so that, upon additive or subtractive recombination, certain frequencies will be selectively suppressed; iterative splitting and recombination of the oscillations in the same manner, with different phase shifts at successive stages, will ultimately result in the isolation of the desired frequency or group of frequencies. Specifically, this procedure may be used to isolate the aforementioned frequencies $F_0$, $F_1$ and $F_2$ from the spectrum of a maser beam or to create a carrier wave $F_0$ with two well-defined sideband frequencies $F'$, $F''$ ($F_0 - F' = F'' - F_0 \equiv \Delta F$) in order to generate an amplitude-modulated carrier with a detectable envelope of frequency $\Delta F$.

The use of a photocell or similar photoelectric transducer as a receiver for interfering beams requires that the rays of each beam impinging upon different portions of a receiving surface (such as that of a photocathode) be precisely in phase with one another. I shall therefore disclose a receiver of this type which, pursuant to still another feature of the invention, comprises a reflector with a paraboloidally concave surface disposed externally of the receiver envelope, the latter being substantially spherical and centered upon the focal point of the paraboloid whereby the intercepted rays will converge upon that point in radial direction of the envelope so as to be substantially free from any refraction at the envelope. The receiving surface (e.g. the face of a photocathode), in turn, is also paraboloidally concave and has a focus coinciding with the center of the envelope. In this manner, each incident beam can be spread over an extended area without appreciable deviation of its rays from their cophasal relationship.

The invention will be described hereinafter in greater detail, reference being made to the accompanying drawing in which:

FIG. 5 is a set of graphs illustrating the phase relationship of several components of the beam spectrum of FIG. 4;

FIG. 6 is a set of graphs illustrating the superposition of beat frequencies resulting from the interfering oscillations of FIG. 5;

FIG. 7 illustrates an amplitude-modulated carrier wave derived from the oscillations of FIG. 6;

FIG. 8 is a set of graphs showing a modulated pacemaker oscillation, representing one of the sidebands of the wave of FIG. 7, and a train of signal pulses derived therefrom for the sampling of a beat-frequency wave as illustrated in FIG. 6;

FIG. 9 shows part of a cycle of a frequency-modulated subcarrier derived from the pulses of FIG. 8;

FIG. 10 shows several cycles of the subcarrier of FIG. 9 on a reduced scale;

FIG. 12 is a block diagram of a somewhat modified transmitter and receiver for laser beams;

FIG. 15 is a set of graphs illustrating the progressive isolation of certain frequencies of the maser beam of the system of FIG. 13;

FIG. 16 is a graph illustrating other components of the maser-beam spectrum;

FIG. 17 is a set of graphs similar to those of FIG. 14 but relating to the frequencies of FIG. 16;

FIG. 18 is a circuit diagram of a communication system with modulating and demodulating means for high-frequency radiation having a spectrum of the type shown in FIGS 16 and 17.

Figure 1:
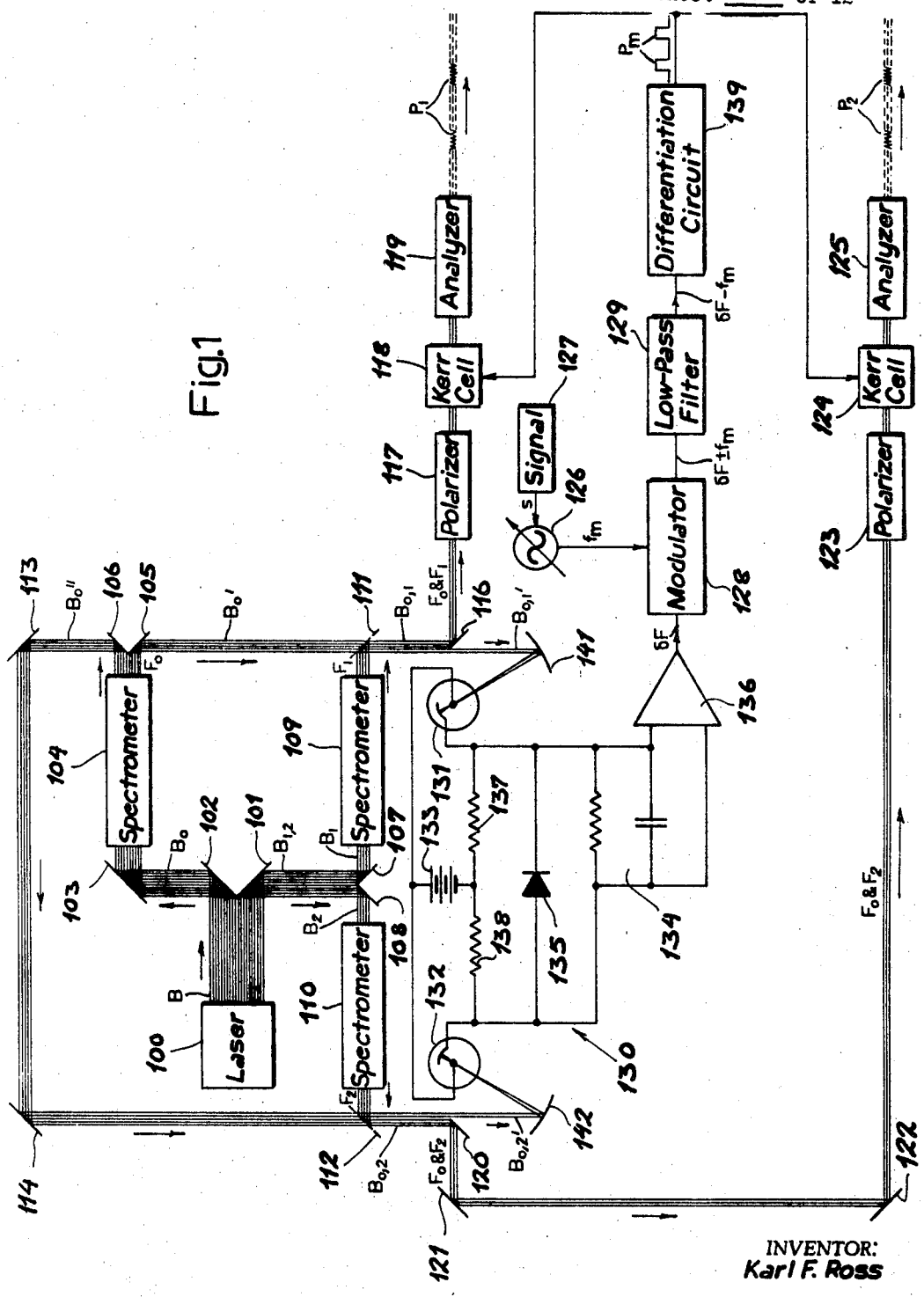
FIG. 1 is a block diagram illustrating the modulation of a laser beam in accordance with my present invention.

In FIG. 1 I have illustrated a message transmitter comprising a laser 100 emitting a beam B toward a pair of reflecting surfaces 101, 102 which split the beam into two ray bundles $B_{1,2}$ and $B_0$. Ray bundle $B_0$ is further reflected at a surface 103 to traverse a spectrometer 104, preferably of the multislit type referred to above, such spectrometers generally including an input gate, an input collimator, a dispersive prism or grating, an output collimator and an output gate following one another in the order named; the input and output gates may have optically complementary or identical zonal patterns of alternately transmitting and nontransmitting zones. Thus, upon its emergence from spectrometer 104 the ray bundle $B_0$ has a substantially monochromatic radiation of frequency $F_0$, this bundle being then split by a pair of further reflecting surfaces 105, 106 into two pencils $B_0'$ and $B_0''$. Ray bundle $B_{1,2}$ separates at two reflecting surfaces 107, 108 into two pencils $B_1$ and $B_2$ respectively traversing two further spectrometers 109 and 110. Upon emerging from spectrometer 109, pencil $B_1$ is substantially monochromatic with a frequency $F_1$; it then impinges upon a semireflector 111 which also receives the pencil $B_0'$ from reflector 105 whereby the two pencils are merged into a single beam $B_{0,1}$ of frequencies $F_0$ and $F_1$. Pencil $B_2$, after exiting from spectrometer 110, has the frequency $F_2$ and strikes a semireflector 112 which also receives, via reflectors 113 and 114, the pencil $B_0''$ from the surface 106; the resulting composite beam $B_{0,2}$ has the frequencies $F_0$ and $F_2$.

The major part of beam $B_{0,1}$ is directed by a reflector 116 onto a polarizer 117 which is followed by a Kerr cell 118 and by an analyzer 119. In analogous fashion, beam $B_{0,2}$ is directed by reflectors 120, 121 and 122 onto a polarizer 123 followed by a Kerr cell 124 and an analyzer 125. The two polarizers 117, 123 have parallel planes of polarization, as have the analyzers 119 and 125.

Kerr cells 118 and 124 are synchronously triggered by the output of a pulse generator which comprises a variable oscillator 126 producing an intermediate frequency $f_m$ which is the result of frequency modulation of a subcarrier frequency $f_0$ by a low-frequency signal $s$ from a source 127. Oscillator 126 controls a modulator 128 whose output is a carrier $\delta F$ with sidebands $\delta F + f_m$ and $\delta F - f_m$. One of these sidebands, here the lower one, is selected by a filter 129 to constitute a pacemaker oscillation with a mean frequency differing slightly (i.e. by the mean output frequency $f_0$ of oscillator 126) from the secondary beat frequency $\delta F$. Oscillation $\delta F$ is derived from a gating network in the form of a bridge circuit 130 comprising a pair of photocells 131, 132 in two of its arms, a directcurrent source 133 connected across one diagonal and a resistance/capacitance network 134 connected across the other diagonal (i.e. between the two photocell cathodes) in parallel with a diode 135; network 134 is connected to the input of an amplifier-detector 136 delivering the oscillation $\delta F$. Photocells 131 and 132 have cathode resistors 137, 138 in the two remaining bridge arms and are respectively irradiated, via external reflectors 141 and 142, by a small fraction of beams $B_{0,1}'$ and $B_{0,2}'$ split off by the reflectors 116 and 120. Oscillation $\delta F$, upon passing through modulator 128 and low-pass filter 129, emerges as a wave of frequency $\delta F - f_m$ which is fed to a differentiation circuit 139 for conversion into a train of time-modulated pulses $P_m$, e.g. as described in my prior U.S. Patents Nos. 2,530,081 and 2,557,038. As the pulses $P_m$ are impressed upon Kerr cells 118 and 124, the radiation leaving the analyzers 119 and 125 is in the form of pulsed laser beams $P_1$, $P_2$ representing bursts of carrier-frequency combinations $F_0$, $F_1$ and $F_0$, $F_2$, respectively.

Figure 2:
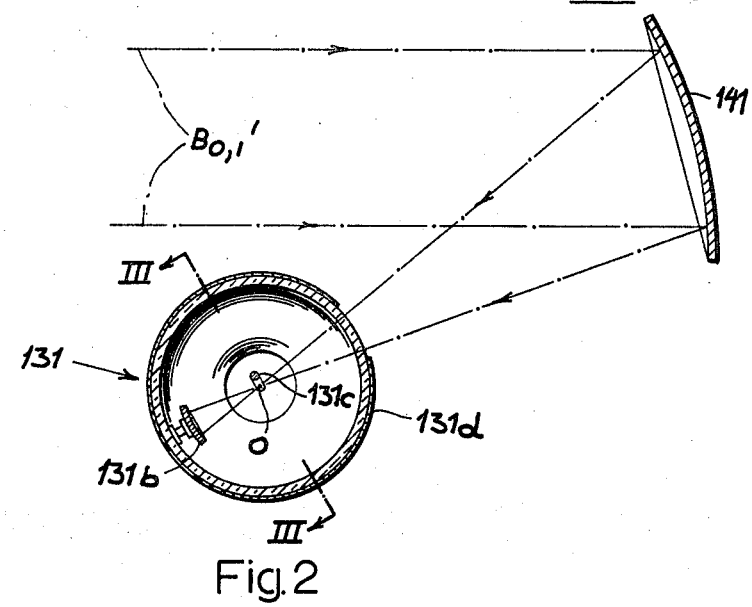
FIG. 2 is a cross-sectional view of a photoelectric transducer forming part of the modulator of FIG. 1.
Figure 3:
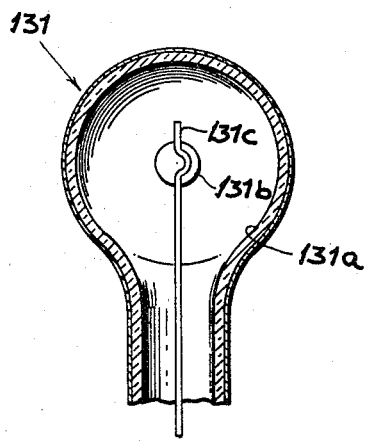
FIG. 3 is a sectional view taken on the line III—III of FIG. 2.

In FIGS. 2 and 3 I have illustrated, on an enlarged scale, the photoelectric transducer 131 of FIG. 1 and its reflector 141, transducer 132 and reflector 142 being identically constructed and arranged. The incident beam $B_{0,1}'$ of parallel rays is focused by reflector 141, curved according to a paraboloid of rotation, upon a point O which is the center of a spherical portion 131a of the envelope of photocell 131. A photoemissive cathode 131b within envelope 131a is also paraboloidally curved and has its focus at O, the two paraboloidal surfaces 141, 131b being disposed on opposite sides of point O. An anode 131c confronts the cathode 131b to intercept emitted electrons, this anode having been shown as a wire which rises along the tube axis but is deformed in the region of point O to provide clearance for the passage of the incident flux. Envelope 131a may be provided with an opaque coating 131d which leaves only a small window for the entrance of the converging rays from reflector 141. It will be apparent that these rays are not bent upon traversing the envelope 131a in radial direction and that, in conformity with the law of parabolas, all ray paths are of exactly the same length.

Figure 4:
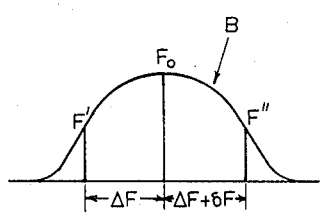
FIG. 4 is a graph of the spectrum of a beam assumed to issue from the laser of FIG. 1.

In FIG. 4 I have shown a possible spectrum of the radiant flux of laser beam B, this spectrum being centered on the frequency $F_0$ and including, on opposite sides thereof, the frequencies $F_1$ and $F_2$ with amplitudes approximately equal to half the amplitude of frequency $F_0$. FIG. 4 also indicates that the separation between frequencies $F_0$ and $F_1$ is equal to $\Delta F$ whereas that between frequencies $F_0$ and $F_2$ equals $\Delta F + \delta F$, the secondary frequency difference $\delta F$ being here taken as positive. It will be understood that, in general, there need not be a single frequency ($F_0$) common to the two beam pairs whose frequencies vary by $\Delta F$ and $\Delta F + \delta F$, respectively.

By way of example it may be assumed that $F_0$, $F_1$ and $F_2$ are of the order of $10^{15}$ cycles per second, $\Delta F$ equals approximately $10^{-3} F_0$ or $10^{12}$ c.p.s. and $\delta F$ represents substantially 1% of $\Delta F$ or $10^{10}$ c.p.s. The intermediate frequency $f_0$ may then have a magnitude of about $10^8$ c.p.s. whereas the signal $s$ should be in or below the megacycle range. Thus, terms such as "high," "low" and "intermediate," as used with reference to frequency in this specification and in the appended claims, have no absolute meaning but are to be construed in light of these possible values.

FIG. 5 illustrates in graphs (a), (b), (c) the wave shape and in graphs (d), (e), (f) the vector position of frequencies $F_1$, $F_0$ and $F_0$ & $F_1$, respectively, graph (c) also indicating the frequency $\Delta F$ as the envelope of the wave $F_0$ & $F_1$. In graphs (d) to (f) the vector $F_0$ has been shown stationary, thus with the time axis $t$ rotating clockwise at angular velocity $\omega_0 = 2\pi F_0$, the relative rotation between vectors $F_1$ and $F_0$ corresponding to $2\pi \Delta F$. The envelope of beat frequency $\Delta F$ in graph (c) is not truly sinusoidal, on account of the lateral excursions of vector $F_0$ & $F_1$ which are a maximum when the two constituent vectors $F_0$, $F_1$ are of like amplitudes and which decrease in angular extent with increasing difference between these amplitudes; thus, the wave shape of the beat-frequency envelope is improved by the choice of relative magnitudes illustrated in FIG. 4 as compared with beats obtained from radiation components of approximately equal intensity. (The notation "$F_0$ & $F_1$" is intended to designate vectorial addition of the two frequencies, in contrast to such notations as "$\Delta F + \delta F$" indicating algebraic—i.e. additive or subtractive—summing of their magnitudes.)

In FIG. 6, graphs (a) and (b) respectively represent the wave $F_0$ & $F_1$, synthesized in the manner illustrated in FIGS. 5(a) to 5(c), and the analogously constituted wave $F_0$ & $F_2$ (with envelope $\Delta F + \delta F$). In the system of FIG. 1, in which these two waves are respectively generated by the superposition of fluxes $F_0$, $F_1$ and $F_0$, $F_2$ on the cathodes of photocells 131 and 132, diode 135 dissipates those cycles of primary beat frequency in which the cathode of cell 132 is driven more highly positive than that of cell 131; in the opposite condition there is developed across the network 134 a pulse, shown shaded in graph (c) of FIG. 6, whose amplitude varies with the relative phase of the envelopes in graphs (a) and (b) so that the envelope of these pulses is of the secondary beat frequency $\delta F$, see graph (d). As the pulses are integrated by the network 134, a coherent reference oscillation of frequency $\delta F$ (assumed to be on the order of 10 gigacycles) appears in the output of amplifier 136 and is amplitude-modulated at 128 by the I-F signal $f_m$ to give rise to the composite wave $\delta F \pm f_m$ shown in FIG. 7.

In FIG. 8 I have illustrated in graph (a) the lower sideband $\delta F - f_m$ of the composite wave of FIG. 7, selected by the filter 129, from which the time-modulated control pulses $P_m$ of graph (b) are derived whenever the wave of graph (a) goes through zero at the beginning of its positive cycle; to this end of differentiation circuit 139 (FIG. 1) includes a half-wave rectifier for suppressing pulses of opposite polarity occurring at alternate zero points, as disclosed in my above-identified prior U.S. patents. FIG. 8(c) shows a train of pulses P, in step with pulses $P_m$ of FIG. 8(b), superimposed upon the coherent reference wave of frequency $F_r = \delta F$ to illustrate the relative phasing thereof; it will be noted that the amplitude of the reference wave at the instants of the pulses varies periodically at a rate which equals the difference in frequency between the oscillations of graphs (a) and (c) of FIG. 8 and thus corresponds to the modulated subcarrier frequency $f_m$ (see FIG. 9). The phase shift per cycle has been greatly exaggerated in FIG. 8(c).

Figure 11:
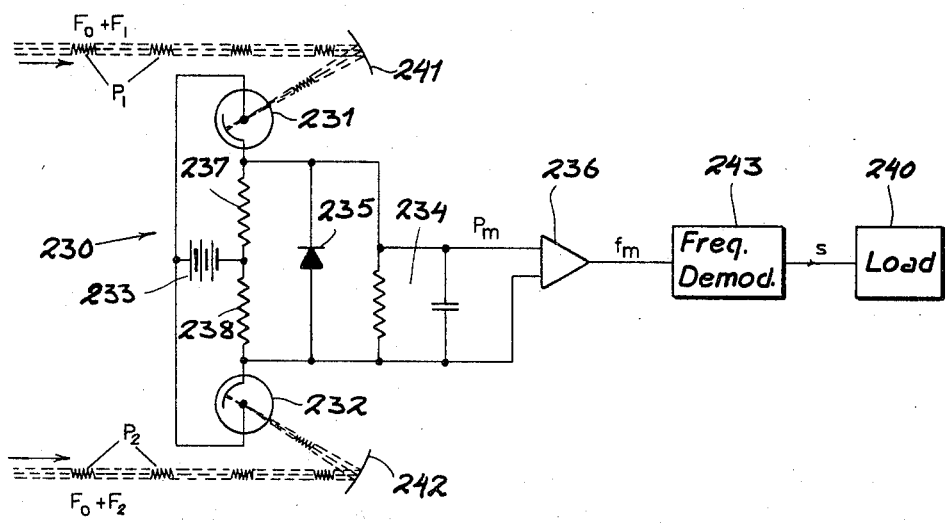
FIG. 11 is a circuit diagram of a receiver for the beams transmitted by the system of FIG. 1.

In the transmitter of FIG. 1 the pulses $P_m$, by triggering the Kerr cells 118 and 124 to produce the pulsed laser beams $P_1$ and $P_2$, convey the information represented by subcarrier $f_m$ to a distant receiving station where these beam fragments are combined in a detector circuit, generally similar to the gating circuit 130 of FIG. 1, to give rise to a train of amplitude-modulated (as well as time-modulated) signal pulses $p_m$, FIG. 10, which can be integrated to reconstitute the oscillation $f_m$. This has been illustrated in FIG. 11 where the intermittent fluxes $P_1$ and $P_2$, arriving substantially simultaneously though with a possible relative phase shift, are directed by respective reflectors 241, 242 to a pair of photocells 231, 232 in a bridge network 230 further including a D-C source 233 and cathode resistors 237, 238. The pulses $p_m$ are developed across an integrating network 234, shunted by a diode 235, and fed to an amplifier 236 whose output is an oscillation of frequency $f_m$; a frequency demodulator 243 recovers from oscillation $f_m$ the original signal $s$ (which may in turn consist of several audiofrequency-modulated subcarriers in different frequency ranges) and delivers it to a load 240.

From FIGS. 8–10 it will be apparent that the envelope $f_m$ can also be defined if some of the pulses $P_m$, P, $p_m$ are omitted, e.g. if only every $k$th one of these pulses comes into existence where k is a whole number greater than 1.

Thus, the pacemaker oscillation shown in FIG. 8(a) may generally have the frequency $$\frac{\delta F}{k} + f_m$$

so long as $k \ll \Delta F/f_m$. The gating circuit of FIG. 1 insures that the selected pacemaker frequency differs only to the desired extent $1/R$ (e.g. on the order of 1%) from the differential carrier frequency of $\delta F$ or a submultiple $\delta F/k$ thereof; where a stable independent generator for the pacemaker oscillation is available, this monitoring circuit may be omitted. Furthermore, it is not necessary to pulse all the constituent frequencies $F_0$, $F_1$, $F_2$ of carrier frequency $\delta F$; thus, either or both side frequencies $F_1$, $F_2$ (or alternately the central frequency $F_0$) could be trained upon the receiving photocells as a continuous rather than intermittent flux and, in such case, may even be locally generated at the receiver. This has been illustrated in FIG. 12 which shows a transmitter with laser 300 producing (after spectrometric filtering, if necessary) a beam $B_0$ of frequency $F_0$, a polarizer 317 for that beam, a Kerr cell 318 and an analyzer 319 beyond the polarizer, a generator 326 of the pacemaker oscillation $$\frac{\delta F}{k} + f_0$$

(the + sign again indicating algebraic summation of either sign), a modulator 328 for converting the output of oscillator 326 into a variable frequency $$\frac{\delta F}{k} + f_m$$

equivalent to that produced by modulator 128 in FIG. 1, and a differentiation circuit 339 deriving from that frequency the time-modulated trigger pulses $P_m$ for the Kerr cell 318. Modulator 328 is here shown as a phase shifter to which a source 327 applies the signal $s$ not directly by way of an integrating circuit 344 which generates the time integral $\int s \cdot dt$ thereof; this is desirable because the phase shift produced by the modulator 328 is the time integral of a resulting frequency shift in its output which, accordingly, in such case contains the signal frequency $s$ rather than its time differential $\dot{s} \equiv ds/dt$. (There is no need for integrating the constant frequency $$\frac{\delta F}{k} + f_0$$

as this would merely produce a constant phase shift.) FIG. 12 also shows an associated receiver with reflectors 301, 302 to split the incoming pulsed beam $P_0$ into fluxes $P_0'$ and $P_0''$ intercepted by semireflectors 311 and 312, respectively. Two lasers 351, 352 locally generate coherent beams $B_1$ and $B_2$ of frequencies $F_1$, $F_2$ which are passed through respectively polarizers 345, 346 designed to restrict their field vectors to planes parallel to the plane of polarization of radiant flux $P_0$ in order to insure alternate reinforcement and cancellation, thus generating the beats of FIG. 6(a) and 6(b), upon the impingement of the composite radiations on the cathodes of a pair of photocells 331, 332 onto which they are directed by reflectors 341, 342 of parabolic cross-section as described in conjunction with FIGS. 2 and 3. The two photocells 331, 332 are part of a bridge circuit 330, similar to the circuits 130 and 230 of FIGS. 1 and 11, whose integrated output is amplified at 336 to yield the modulated subcarrier $f_m$ from which a frequency demodulator 343 derives the input signal $s$ for delivery to a load 340. If the integrating circuit 334 were not provided at the transmitter, the output signal of demodulator 343 would be the aforementioned differential $\dot{s}$ so that an integrating circuit similar to element 344 would have to be inserted between units 343 and 340 if it were desired to reconstruct the original signal $s$; alternatively, as illustrated in FIG. 18 and described hereinafter, the circuit 343 could be replaced in such case by a phase demodulator (e.g. of the type disclosed in my U.S. Patent No. 2,557,038 already referred to) whereupon the input and output signals would be substantially identical without the interposition of an integrating circuit. Thus, either type of angle modulation (frequency or phase) may be used on a pacemaker oscillation generated in accordance with this invention to pulse a beam of higher carrier frequency.

Figure 13:
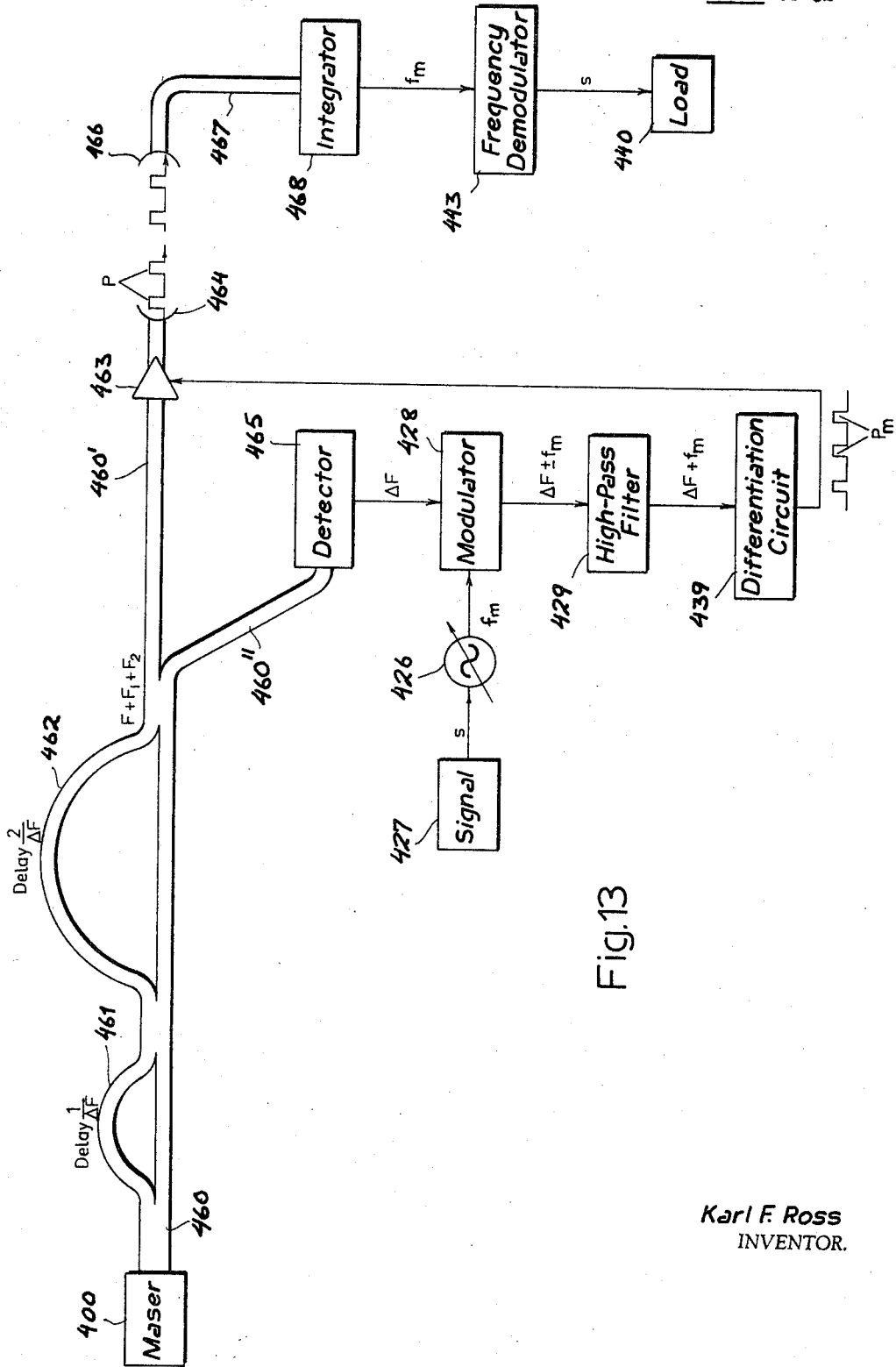
FIG. 13 is a block diagram of a transmitter and receiver for maser beams modulated in accordance with this invention.

In FIG. 13 I have shown a system in which the same principle, i.e. isolation and recombination of adjacent carrier frequencies with pulsing of the composite wave, is applied to oscillations in the microwave range where spectrometric separation is no longer feasible. In this range, on the other hand, the original carrier frequencies are low enough to eliminate the need for cascading of the beats so that the primary beat frequency $\Delta F$ of two carriers may be used directly as the reference wave $F_r$ which is sampled in the rhythm of a suitable pacemaker oscillation to produce a train of pulses of variable amplitude. Thus, FIG. 13 depicts a maser 400 working into a waveguide 460 which has several loops 461, 462 for splitting off and delaying part of the transmitted radiation to create relative phase shifts which serve to cancel out certain frequency components and to reinforce others, as will be more fully described hereinafter with reference to FIGS. 14–17. Beyond loop 462 the waveguide divides into two branches 460', 460'' each conducting part of the resulting radiation, branch 460' including a normally blocked microwave amplifier 463 and terminating at a radiator 464 whereas branch 460'' leads to a detector 465 whose output is a reference wave of frequency $\Delta F$. This wave passes through a modulator 428 also receiving the modulated subcarrier $f_m$ from a variable oscillator 426 which in turn is controlled by the input signal $s$ from a source 427. A filter 429 selects one of the two sidebands (here the upper sideband $\Delta F + f_m$) from the output $\Delta F \pm f_m$ of modulator 428 and delivers it to a differentiation circuit 439 to produce the time-modulated pulses $P_m$ which are applied to a control electrode of amplifier 463 whereby the latter is periodically unblocked and a train of microwave pulses P is transmitted by the radiator 464. These pulses arrive at a receiver 466 and are conducted by a waveguide 467 to an integrator 468 which recovers from them the intermediate-frequency wave $f_m$; this wave is fed to a frequency demodulator 443 which reconstructs the signal $s$ for delivery to a load 440.

Figure 14:
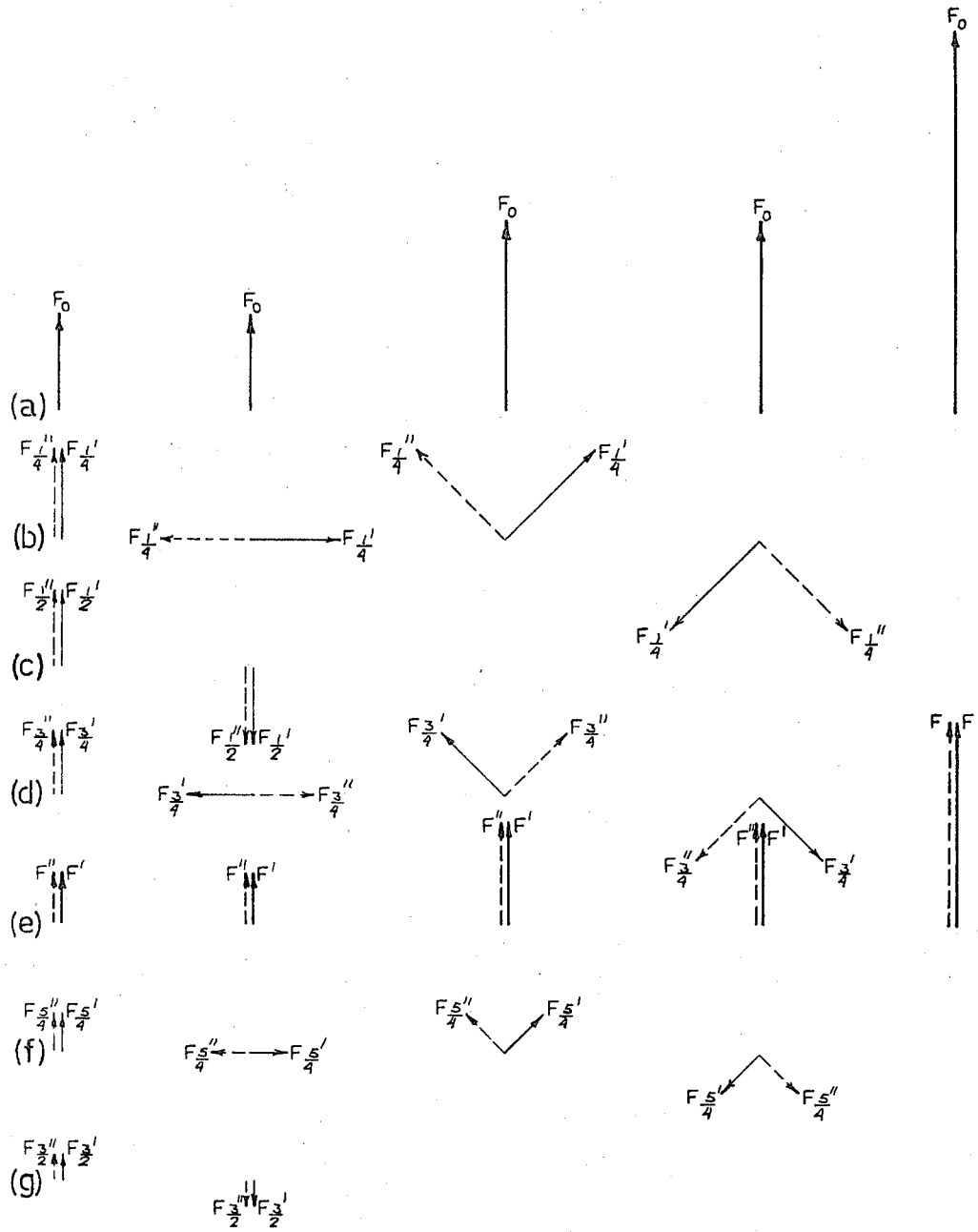
FIG. 14 is a set of graphs illustrating the relationship of certain frequency components in the output of the maser of FIG. 13.

FIG. 14 shows in graph (a) the vector of the central frequency $F_0$ of the maser beam whose spectrum may have the shape shown in FIG. 15(a). Thus, frequency $F_0$ is assumed to be flanked by two frequencies F', F'', both separated from it by a difference $\Delta F$, whose amplitude is about half that of $F_0$ so that the combination of frequencies $F_0$, F', F'' yields a carrier $F_0$ 100% amplitude-modulated with a frequency $\Delta F$. In order to produce this wave form, it is necessary to suppress in the maser spectrum all the other frequencies both below and above the center frequency $F_4$. The lower frequencies have been designated $F_{1/4}'$, $F_{1/2}'$, $F_{3/4}'$, $F_{5/4}'$ and $F_{3/2}'$, the subscripts indicating their respective distances from $F_0$ in terms of $\Delta F$; thus $F_{1/2}'$ lies halfway between $F_0$ and F'. The upper frequencies have been analogously designated $F_{1/4}''$, $F_{1/2}''$, $F_{3/4}''$, $F_{5/4}''$ and $F_{3/2}''$. In FIG. 14, graps (b), (c), (d), (e), (f) and (g) respectively show the paired frequencies of FIG. 15(a), such as $F_{1/4}'$, $F_{1/4}''$ or F', F'', in the order of increasing distance from $F_0$.

It has been assumed for convenience that all the frequency vectors are in phase at a time $t_0$ indicated at the extreme left in FIG. 14. At a subsequent time $$t_0 + \frac{1}{\Delta F}$$

the frequencies of graph (b) have become offset from $F_0$ by $\pm \pi/2$; the frequencies of graphs (c) to (g) have been displaced by increasing multiplies of $\pi/2$. As loop 461 in FIG. 13 is shown to be of such length as to delay the radiation passing therethrough by substantially $1/\Delta F$ with reference to that continuing in the main stem of waveguide 460, and as the two fluxes are assumed to be of equal intensity, the vectors $F_0$ in graph (a) and F', F" in graph (e) will double in magnitude whereas those in graphs (c) and (g) will experience a relative phase shift of $\pi$ or an odd multiple thereof and will therefore cancel. The remaining vector pairs, with frequency shifts of $\pi/2$ or an odd multiple thereof, will be reinforced to a lesser extent than $F_0$, F', F" and will therefore appear relatively attenuated. The resulting frequency spectrum appears in FIG. 15(b). All this requires, however, that at the instant of recombination the vectors $F_0$ and F', F" of the two fluxes should be precisely in phase which will be true only if the delay time of loop 461 is an exact multiple of the period $1/F_0$ of the center frequency; the fact that $F_0$ may not be an exact multiple of $\Delta F$ is of no consequence since the delay time may deviate slightly from $1/\Delta F$ without any material change in the phase relationships of the remaining vectors as long as $\Delta F \ll F_0$.

At $t_1$ in FIG. 14 I have shown the components of the radiation in waveguide 460, as it exists between the loops 461 and 462, at an instant when for convenience the vectors $F_0$ and F', F" are again assumed to be in phase. Now the vectors $F_{1/4}'$, $F_{1/4}''$ of graph (b), $F_{3/4}'$, $F_{3/4}''$ of graph (d) and $F_{5/4}'$, $F_{5/4}''$ of graph (f) are out of phase with vector $F_0$ by $\pi/4$ or different odd multiples thereof. At a subsequent time $$t_1 + \frac{2}{\Delta F}$$

therefore all these vectors will be pointing in the opposite direction so that a delay of substantially $2/\Delta F$ in loop 462 (but equal to an exact multiple of $1/F_0$) will result in their cancellation upon recombination of the two fluxes respectively passing through that loop and through the main stem of waveguide 460. The final frequency spectrum, e.g. as it occurs at an instant $t_2$ (FIG. 14) beyond loop 462, will have the shape illustrated in FIG. 15(c), with distinct peaks F', $F_0$, F" and with minor secondary maxima in the regions of $F_{1/3}'$, $F_{1/3}''$ and $F_{2/3}'$, $F_{2/3}''$. If desired, these secondary maxima can also be eliminated with the aid of further loops and by a technique as described hereinafter with reference to FIGS. 16–18.

If it were desired to eliminate the central frequency $F_0$ so as to leave only the two sidebands F' and F", a further loop would be required beyond loop 462 with a delay substantially equal to $1/2\Delta F$ and exactly equal to an odd multiple of $1/2F_0$ in order to split the flux into two portions in which the vectors $F_0$ are in phase opposition whereas the vector pairs F', F" are in phase with each other. Conversely, carrier $F_0$ alone could be isolated if the delay were exactly equal to a whole multiple of $1/F_0$, thus differing by half a carrier-frequency cycle from that required in the first-mentioned case.

FIG. 16 shows a spectrum with frequencies $F_0$, $F_{1/3}'$, $F_{1/3}''$, $F_{2/3}'$, $F_{2/3}''$, F' and F", the corresponding vectors being illustrated in graphs (a), (b), (c) and (d) of FIG. 17. At the first stage A (extreme left) it is again assumed that the several vectors are all in phase; the second stage B represents a relative shift equivalent to a delay of $3/2\Delta F$ whereby the vector pairs $F_{1/3}'$, $F_{1/3}''$ and F', F" are relatively inverted, the remaining vectors being in phase. If the two composite oscillations are differently combined, as shown at stage C, vectors $F_0$ and $F_{2/3}'$, $F_{2/3}''$ are eliminated. Stage D represents a further relative phase shift equivalent to a delay of $1/2\Delta F$ which produces a phase shift of $\pi$ in the vector pairs F', F" of the two oscillations and one of $\pi/3$ in the vector pairs of graph (b), the result of the combination of the outputs from stages C and D being shown at stage E. Stage F illustrates the rotation of the latter vector pair through an angle of $\pm 5\pi/6$ (corresponding to a delay of $5/4\Delta F$) so as to place these vectors in phase opposition to the same vectors as shown at stage C. If, therefore, the oscillations represented by stages C and F are additively combined, only the vector pair F', F" will remain as shown at stage G.

The relative phase shift described in conjunction with FIGS. 14 and 17 can also be introduced by band-pass filters instead of delay lines, this being particularly important with oscillations of greater wavelength than those contemplated in conjunction with FIG. 13, hence in a range where waveguides can no longer be used and other delay means may not afford the necessary accuracy. Simple band-pass filters of the so-called constant-K type introduce phase shifts varying progressively from $-\pi$ to $+\pi$ between opposite limits of the pass band, and multisection filters (or several filters connected in series) produce multiples of these phase shifts; reference in this connection may be made to "General Network Analysis" by W. R. LePage and S. Seely, McGraw-Hill 1962, FIGS. 7–16, 7–26 and 7–28. The use of such filters has been illustrated in FIG. 18 where the output of an oscillator 500, assumed to have the shape of the spectrum outlined in FIG. 16, is transmitted over a line 560 with a branch 561 including a band-pass filter 571 with a shift of $\pm 3\pi$ from its center frequency, thus with an overall shift of $6\pi$ between the limits F', F" of its pass band so as to bring about the situation illustrated at B and C in FIG. 17 when the two oscillations are differentially recombined with the aid of a pair of amplifiers 580, 581 connected in push-pull across a transformer 582. The output of this transformer is transmitted via a line 570, in part directly and in part via a branch 562 including a band-pass filter 572, to an amplifier 583; filter 572 has the same pass band F'—F" but with an overall phase shift of $2\pi$ so as to create the situation depicted at D and E in FIG. 17. Amplifier 583 works into still another band-pass filter 573 with an overall phase shift of $2\pi$ in a pass band ranging from $F_{2/5}'$ to $F_{2/5}''$ designed to produce the rotation of substantially $\pm 5\pi/6$ for the vectors $F_{1/3}'$, $F_{1/3}''$ described in conjunction with stages E and F of FIG. 17. Part of the output of transformer 582 is combined with an equivalent part of the output of filter 573, suitably selected by a potentiometer 574, in an amplifier 575 whose output then contains substantially exclusively the two sideband frequencies F', F", as explained with reference to stage G of FIG. 17, in addition to the carrier $F_0$ separately supplied to amplifier 575 from oscillator 500 via a filter 576 with narrow pass band. Potentiometer 574 is, of course, representative of similar adjusting means that may be provided also at other locations in the circuit, particularly at the other unidirectionally conductive junction devices represented by the differential amplifiers 580–582 and the linearly additive amplifier 583.

The radiation delivered by amplifier 575 is fed to an antenna 576 which transmits it to one or more receiving stations to serve as a reference oscillation, devoid of any independent information content, to be sampled by time-modulated pulses carrying signals which may be different for the several receiving stations. One such receiving station has been illustrated in FIG. 18 and comprises a receiving antenna 577 for the high-frequency waves from antenna 576 which may be an omnidirectional or broadly directional radiator. The signal pulses destined for this receiving station are generated, in a manner analogous to that described with reference to FIGS. 1 and 13, by a gating circuit including a detector 565 which receives the output of amplifier 575 and derives from it the difference frequency $\Delta F$ which it supplies to a modulator 578. An oscillator 526 produces a fixed intermediate frequency $kf_0$ controlling the modulator 578 so as to give rise to an oscillation with a carrier and two sidebands of which one, here the upper, is selected by a filter 529; this sideband $\Delta F + kf_0$ is fed to a frequency divider 579 which converts it into a frequency $$\frac{\Delta F}{k} + f_0$$

for modulation in a phase shifter 528 by the signal $s$ from a source 527. The output of phase shifter 528, which is differentiated in a circuit 539 for generating a pulse train to unblock a normally nonconductive amplifier 563, is a pacemaker oscillation that may be symbolized by the notation $$\frac{\Delta F}{k} + \dot{f}_m$$

where $$\dot{f}_m$$

represents the subcarrier $f_0$ phase-modulated by the signal $s$ (which is substantially equivalent to frequency modulation by the differential signal $\dot{s}$.

Amplifier 563 lies in the transmission path of an auxiliary beam from a source 585, e.g. a maser, which is converted in interrupter 563 into discrete control pulses $P_x$ at the cadence of the pacemaker oscillation, these pulses being trained by a radiator 586 upon a receiver 587 at the distant station. There a pulse shaper 588 converts the intermittent flux $P_x$ into pulses suitable to unblock a normally nonconductive amplifier 589 receiving the composite reference wave $F_0$, $F'$, $F''$ from antenna 577. The resultant samplings of this reference wave are integrated in a circuit 568 which thus reproduces the modulated subcarrier $$\dot{f}_m$$

the latter being fed by way of a filter 590 to a phase demodulator 543 for reconstitution of the signal $s$ to be delivered to a load 540. Filter 590 has a pass band centered on the mean value $f_0$ of the modulated subcarrier frequency $$\dot{f}_m$$

other filters 591, 592 etc., tuned to pass other subcarriers, work into similar load circuits not shown. Since the reference wave $F_0$, $F'$, $F''$ carries no information, it (or some component thereof) could be generated locally at the receiving station, e.g. as illustrated in FIG. 12 for the frequencies $F_1$ and $F_2$. The frequency of the auxiliary carrier from source 585 is unrelated to the other frequencies, apart from the requirement that it should be much higher than $\Delta F$, and may thus be selected at will in, say, the microwave or even the optical range. More than one auxiliary laser or maser beam could, if desired, be trained upon the receiving station to convey different signals or modulated subcarriers adapted to be individually reproduced with the aid of the common reference wave.

The generator 526 and/or the frequency divider 579 could be made adjustable so as to give the step-down ratio of divider 579 an integral value $n$ different from the factor $k$ in the oscillator output whereby the unmodulated pacemaker oscillation, fed to phase modulator 528, will have a frequency $$\frac{\Delta F + k f_0}{n}$$

corresponding to a subcarrier frequency $kf_0/n$; thus the filters 591, 592 may be designed to pass subcarriers $k\dot{f}_m/n$ where the ratio $k/n$ has different values. If only one load circuit is to be energized at the receiving station, the frequency divider 579 and the filters 590, 591, 592 etc. may be omitted in which case the operating frequency of oscillator 562 will simply be $f_0$.

From FIG. 8(c) it will be apparent that the time-modulated pulses P, whose rate of recurrence differs but slightly from the frequency of the associated reference wave $F_r$ or some aliquot part thereof, must be of sharply limited width corresponding to but a small fraction of a cycle of the reference wave. This places a practical upper limit on the frequency of the reference wave $F_r$ whose period $1/F_r$ should, for convenience, be related to the pulse width by a ratio on the same order (e.g., 100:1) as the ratio R between the reference frequency $F_r$ and the subcarrier frequency $f_0$. In FIG. 18 it has been assumed that the frequency $F_0$ produced by oscillator 500 is too high to satisfy this requirement; if, however, this is not the case, then $F_0$ alone could be radiated by antenna 576, or transmitted by some other channel, and could also be fed directly to the modulator 578 in lieu of a difference frequency $\Delta F$, detector 565 becoming thereby unnecessary.

Figure 19:
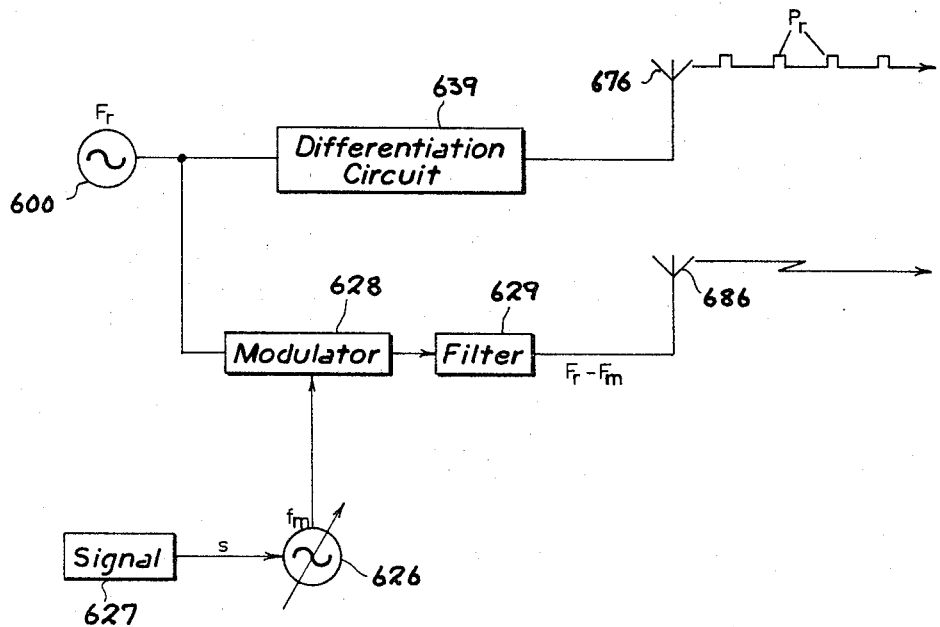
FIG. 19 is a circuit diagram of a modified transmitter for a communication system generally similar to that of FIG. 18.

A system of the latter type has been illustrated in FIG. 19 which also shows a reversal of the arrangements previously described in that the pacemaker oscillation is transmitted as a coherent wave while control pulses are derived from a reference wave of frequency $F_r$. Thus, the transmitter of FIG. 19 includes an oscillator 600 working into a differentiation circuit 639 to produce control pulses $P_r$ of fixed cadence which are transmitted via an antenna 676; another part of the oscillator output is directed to a modulator 628 controlled by the modulated subcarrier $f_m$ derived from a variable oscillator 626 in response to signal $s$ from a source 627. A sideband, such as $F_r - f_m$, in the output of modulator 628 is selected by a filter 629 and fed to another aerial 686 for transmission to a remote station along with the pulses $P_r$. Again, as previously noted and as shown in FIG. 12, the unmodulated carrier $F_r$ could be locally generated at the receiver and differentiated to produce the pulses $P_r$. These pulses are, in either case, applied at the remote station to an amplifier such as the one shown at 589 (FIG. 18) to unblock it periodically for the passage of the received modulated wave $F_r - f_m$ from antenna 686.

From FIGS. 8–10 it will be clear that the inversion just described will also give rise to amplitude-modulated signal pulses $P_m$ which can be integrated to reproduce the modulated subcarrier $f_m$. These figures also show that, since the number of pulses $P_m$ in a cycle of subcarrier $f_m$ corresponds to the ratio $R = F_r/f_0$ previously defined, a small proportional change in the frequency of the pacemaker oscillation (say, of 0.1%) will lead to a large proportional frequency variation of subcarrier $f_m$ (e.g., 10% if $R=100$) whose demodulation, therefore, will give rise to a distinct signal which would be difficult to detect if either the pacemaker wave itself or the derivative pulses $P_m$ were subjected to direct frequency or phase demodulation.

The selective elimination of specific components from a broad frequency band, disclosed with reference to FIGS. 14–17, may also have utility in other systems, e.g., for separating closely adjoining modulated carriers from one another or for suppressing jamming frequencies in broadcasting.

Naturally, my invention admits of various modifications, including combinations and substitutions of compatible features from different disclosed embodiments, which will be readily apparent to persons skilled in the art and which are intended to be embraced within its scope except as otherwise limited by the appended claims.

I claim:

1. In a communication system including a transmitting station and a receiving station linked by a transmission channel, the combination therewith of means at said transmitting station for generating a first high-frequency oscillation, a source of low-frequency signals at said transmitting station, modulator means at said transmitting station for varying the frequency of said first oscillation under the control of said signals to an extent representing a small fraction of the mean frequency of said first oscillation, means at one of said stations for generating a second high-frequency oscillation of fixed frequency differing from the mean frequency of said first oscillation by an intermediate frequency substantially smaller than said fixed frequency but greater than the frequency excursions of said first oscillation due to said signals, differentiation means at one of said stations for deriving from one of said oscillations a train of control pulses with a cadence harmonically related to the frequency thereof, circuit means at one of said stations triggerable by said control pulses for sampling the other of said oscillations in the rhythm of said control pulses whereby a train of signal pulses of varying amplitude is produced, integrating means at said receiving station, means including said channel for delivering said signal pulses to said integrating means, and demodulating means at said receiving station connected to said integrating means for receiving therefrom an output wave in the shape of a subcarrier of said intermediate frequency and for substantially reconstructing said signals from said subcarrier.

2. In a communication system including a transmitting station and a receiving station linked by a transmission channel, the combination therewith of means at said transmitting station for generating a first high-frequency oscillation, a source of low-frequency signals at said transmitting station, modulator means at said transmitting station for varying the frequency of said first oscillation under the control of said signals to an extent representing a small fraction of the mean frequency of said first oscillation, means at one of said stations for generating a second high-frequency oscillation of fixed frequency differing from the mean frequency of said first oscillation by an intermediate frequency substantially smaller than said fixed frequency but greater than the frequency excursions of said first oscillation due to said signals, differentiation means at said transmitting station for deriving from one of said oscillations a train of control pulses with a cadence harmonically related to the frequency thereof, circuit means at one of said stations triggerable by said control pulses for sampling the other of said oscillations in the rhythm of said control pulses whereby a train of signal pulses of varying amplitude is produced, integrating means at said receiving station, means for transmitting one of said trains of pulses over said channel and for delivering said signal pulses to said integrating means, and demodulating means at said receiving station connected to said integrating means for receiving therefrom an output wave in the shape of a subcarrier of said intermediate frequency and for substantially reconstructing said signals from said subcarrier.

3. In a communication system, in combination, radiation-producing means for generating a composite flux consisting of at least two monochromatic beams with frequencies sufficiently close to one another to give rise to a beat frequency substantially lower than the beam frequencies, a source of pulses time-modulated by a signal of a frequency substantially lower than said beat frequency, control means in the path of at least one of said beams for converting same into successive bursts of carrier wave with a cadence corresponding to that of said pulses, receiving means for said flux at a location remote from said control means, detector means connected with said receiving means for deriving from said flux a train of signal pulses in step with said bursts and of a varying amplitude depending upon the phasing of said bursts with reference to said beat frequency, and integrating means connected to said detector means for converting said signal pulses into a coherent wave representative of said signal.

4. The combination defined in claim 3 wherein said radiation-producing means comprises a generator of radiation with a spectrum including at least one redundant frequency other than said beam frequencies, means forming a branch path for part of the flux energy and a main part for the remaining flux energy with a progressive phase shift therebetween for the frequencies of said spectrum, the extent of said phase shift being such that the relative phasing of said redundant frequency in the two flux portions differs by substantially $\pi$ from the relative phasing of each of said beam frequencies at a predetermined junction of said paths, and means at said junction for combining said flux energies with substantial cancellation of said redundant frequency.

5. In a communication system, in combination, radiation-producing means for generating a composite flux consisting of at least two monochromatic beams with frequencies sufficiently close to one another to give rise to a beat frequency substantially lower than the beam frequencies sufficiently close to one another to give rise to of a frequency substantially lower than said beat frequency, said pulses having a cadence differing slightly from an aliquot part of said beat frequency, control means in the path of at least one of said beams for converting same into successive bursts of carrier wave with a cadence corresponding to that of said pulses, receiving means for said flux at a location remote from said control means, detector means connected with said receiving means for deriving from said flux a train of signal pulses in step with said bursts and of a varying amplitude depending upon the phasing of said bursts with reference to said beat frequency, and integrating means connected to said detector means for converting said signal pulses into a coherent wave representative of said signal.

6. In a communication system, in combination, radiation-producing means for generating a composite flux consisting of at least two monochromatic beams with frequencies sufficiently close to one another to give rise to a beat frequency substantially lower than the beam frequencies, a source of low-frequency signals, generator means including said source for producing a variable-frequency oscillation with a mean value differing from said beat frequency by an intermediate frequency higher than the highest signal frequency but substantially lower than said beat frequency, differentiation means connected to said generator means for deriving form said variable-frequency oscillation a train of control pulses with a cadence harmonically related to the frequency thereof, circuit means connected to said differentiation means and interposed in the path of at least a portion of said flux for pulsing same in the rhythm of said control pulses whereby a train of bursts of radiation of varying intensity is produced, receiving means for said bursts of radiation at a location remote from said circuit means, integrating means connected to said receiving means, and demodulating means connected to said integrating means for receiving therefrom an output wave at said intermediate frequency and for substantially reconstructing said signals therefrom.

7. In a communication system, in combination, radiation-producing means for generating a composite flux consisting of at least two monochromatic beams with frequencies sufficiently close to one another to give rise to a beat frequency substantially lower than the beam frequencies, detector means positioned to intercept part of said flux for deriving therefrom a reference oscillation of a frequency corresponding to said beat frequency, a source of low-frequency signals, modulator means connected to said detector means and to said source for alegbraically combining said reference oscillation with a subcarrier of an intermediate frequency substantially lower than said beat frequency and for modulating said intermediate frequency under the control of said signals whereby there is produced a variable-frequency oscillation differing but slightly from said beat frequency, differentiation means connected to said modulation means for deriving from said variable-frequency oscillation a train of control pulses with a cadence harmonically related to the frequency thereof, circuit means connected to said differentiation means and interposed in the path of at least a portion of the remainder of said flux for pulsing same in the rhythm of said control pulses whereby a train of signal pulses of varying amplitude is produced, receiving means for said signal pulses at a location remote from said detector and modulator means, integrating means connected to said receiving means, and demodulating means connected to said integrating means for receiving therefrom an output wave substantially in the shape of said subcarrier and for substantially reconstructing said signals from said subcarrier.

8. In a communication system, in combination, radiation-producing means for generating two pairs of monochromatic beams with frequencies separated by respective difference frequencies which are substantially lower than the beam frequencies and differ from each other by a beat frequency substantially lower than said difference frequencies, a source of low-frequency signals, generator means including said source for producing a variable-frequency oscillation with a mean value differing from said beat frequency by an intermediate frequency higher than the highest signal frequency but substantially lower than said beat frequency, differentiation means connected to said generator means for deriving from said variable-frequency oscillation a train of control pulses with a cadence harmonically related to the frequency thereof, circuit means connected to said differentiation means and interposed in the path of at least one beam of each pair for pulsing same in the rhythm of said control pulses, receiving means remote from said circuit means for intercepting pulsed radiation from said one beam of each pair together with radiation at the frequencies of the remaining beams whereby a train of signal pulses of varying amplitude is produced, integrating means connected so said receiving means, and demodulating means connected to said integrating means for receiving therefrom an output wave at said intermediate frequency and for substantially reconstructing said signals therefrom.

9. The combination defined in claim 8 wherein said beams are in the range of optical radiation and wherein said receiving means comprises a pair of photoelectric transducers each disposed to receive a respective beam pair, said transducers being differentially connected in a common output circuit including said integrating means.

10. In a communication system, in combination, radiation-producing means for generating a composite flux of a principal monochromatic beam and two auxiliary monochromatic beams with frequencies separated from that of said principal beam by respective difference frequencies which are substantially lower than the beam frequencies and differ from each other by a beat frequency substantially lower than said difference frequencies, a source of low-frequency signals, generator means including said source for producing a variable frequency oscillation with a mean value differing from said beat frequency by an intermediate frequency higher than the highest signal frequency but substantially lower than said beat frequency, differentiation means connected to said generator means for deriving from said variable frequency oscillation a train of control pulses with a cadence harmonically related to the frequency thereof, circuit means connected to said differentiation means and interposed in the path of at least said principal beam for pulsing same in the rhythm of said control pulses, receiving means remote from said circuit means for intercepting pulsed radiation from said principal beam together with radiation at the frequencies of said auxiliary beams whereby a train of signal pulses of varying amplitude is produced, integrating means connected to said receiving means, and demodulating means connected to said integrating means for receiving therefrom an output wave at said intermediate frequency and for substantially reconstructing said signals therefrom.

11. In a communication system, in combination, radiation-producing means for generating two pairs of monochromatic beams with frequencies separated by respective difference frequencies which are substantially lower than the beam frequencies and differ from each other by a beat frequency substantially lower than said difference frequencies, gating means positioned to intercept part of each beam pair for deriving therefrom a reference oscillation of a frequency corresponding to said beat frequency, a source of low-frequency signals, modulator means connected to said gating means and to said source for algebraically combining said reference oscillation with a subcarrier of an intermediate frequency substantially lower than said beat frequency and for modulating said intermediate frequency under the control of said signals whereby there is produced a timing oscillation of variable frequency differing but slightly from said beat frequency, differentiation means connected to said modulator means for deriving from said timing oscillation a train of control pulses with a cadence harmonically related to the frequency thereof, circuit means connected to said differentiation means and interposed in the path of other portions of at least one beam of each pair for pulsing same in the rhythm of said control pulses, receiving means remote from said gating and modulator means for intercepting pulsed radiation from said one beam of each pair together with radiation at the frequencies of the remaining beams whereby a train of bursts of radiation of varying intensity is produced, integrating means connected to said receiving means, and demodulating means connected to said integrating means for receiving therefrom an output wave substantially in the shape of said subcarrier and for substantially reconstructing said signals from said subcarrier.

12. The combination defined in claim 11 wherein said beams are in the range of optical radiation, at least one of said gating and receiving means comprising a pair of photoelectric transducers positioned to receive part of respective beam pairs and differentially connected in a common output circuit.

13. In a communication system, in combination, radiation-producing means for generating a composite flux consisting of a principal monochromatic beam and two auxiliary monochromatic beams with frequencies separated from that of said principal beam by respective difference frequencies which are substantially lower than the beam frequencies and differ from each other by a beat frequency substantially lower than said difference frequencies, gating means positioned to intercept part of said flux for deriving therefrom a reference oscillation of a frequency corresponding to said beat frequency, a source of low-frequency signals, modulator means connected to said gating means and to said source for algebraically combining said reference oscillation with a subcarrier of an intermediate frequency substantially lower than said beat frequency and for modulating said intermediate frequency under the control of said signals whereby there is produced a timing oscillation of variable frequency differing but slightly from said beat frequency, differentiation means connected to said modulator means for deriving from said timing oscillation a train of control pulses with a cadence harmonically related to the frequency thereof, circuit means connected to said differentiation means and interposed in the path of other portions of at least said principal beam for pulsing same in the rhythm of said control pulses, receiving means remote from said gating and modulator means for intercepting pulsed radiation from said principal beam together with radiation at the frequencies of said auxiliary beams whereby a train of bursts of radiation of varying intensity is produced, integrating means connected to said receiving means, and demodulating means connected to said integrating means for receiving therefrom an output wave substantially in the shape of said subcarrier and for substantially reconstructing said signals from said subcarrier.

14. In a communication system including a transmitting station and a receiving station linked by a transmission channel, the combination therewith of means at said transmitting station for generating a pair of high-frequency waves of fixed frequencies separated by a beat frequency substantially lower than said fixed frequencies, detector means at said transmitting station for deriving from said high-frequency waves a reference oscillation of a frequency corresponding to said beat frequency, a source of low-frequency signals at said transmitting station, modulator means at said transmitting station connected to said detector means and to said source for algebracially combining said reference oscillation with a subcarrier of an intermediate frequency substantially lower than said beat frequency and for modulating said intermediate frequency under the control of said signals whereby there is produced a variable-frequency oscillation differing but slightly from said beat frequency, differentiation means at one of said stations for deriving from one of said oscillations a train of control pulses with a cadence harmonically related to the frequency thereof, circuit means at one of said stations triggerable by said control pulses for sampling the other of said oscillations in the rhythm of said control pulses whereby a train of signal pulses of varying amplitude is produced, integrating means at said receiving station, means including said channel for delivering said signal pulses to said integrating means, and demodulating means at said receiving station connected to said integrating means for receiving therefrom an output wave substantially in the shape of said subcarrier and for substantially reconstructing said signals from said subcarrier.

15. In a communication system including a transmitting station and a receiving station linked by a transmission channel, the combination therewith of means at said transmission station for generating two pairs of high-frequency waves of fixed frequencies separated by respective difference frequencies which are substantially lower than said fixed frequencies and differ from each other by a beat frequency substantially lower than said difference frequencies, detector means at said transmitting station for deriving from said pairs of high-frequency waves a reference oscillation of a frequency corresponding to said beat frequency, a source of low-frequency signals at said transmitting station, modulator means at said transmitting station connected to said detector means and to said source for algebraically combining said reference oscillation with a subcarrier of an intermediate frequency substantially lower than said beat frequency and for modulating said intermediate frequency under the control of said signals whereby there is produced a variable-frequency oscillation differing but slightly from said beat frequency, differentiation means at one of said stations for deriving from one of said oscillations a train of control pulses with a cadence harmonically related to the frequency thereof, circuit means at one of said stations triggerable by said control pulses for sampling the other of said oscillations in the rhythm of said control pulses whereby a train of signal pulses of varying amplitude is produced, integrating means at said receiving station, means including said channel for delivering said signal pulses to said integrating means, and demodulating means at said receiving station connected to said integrating means for receiving therefrom an output wave substantially in the shape of said subcarrier and for substantially reconstructing said signals from said subcarrier.

16. In a signaling system including a source of composite flux of optical radiation consisting of a plurality of coincident monochromatic parallel-ray beams of closely spaced frequencies, the combination therewith of a photoelectric transducer comprising reflector means for said beams, said reflector means having a parabolic curvature with a focus beyond the beam path, and further comprising a photoelectric cell with an envelope having an entrance window for said beams spherically curved about said focus and with an electron-emissive receiving surface of spherical curvature confronting said window and centered on said focus, said cell being provided with an output circuit for electronically reproducing a beat frequency derived from the beam frequencies.

17. In a signaling system including a source of composite flux of optical radiation consisting of two pairs of coincident monochromatic parallel-ray beams of closely spaced frequencies which differ by a frequency $\Delta F$ in one of said beam pairs and by a frequency $\Delta F + \delta F$ in the other of said beam pairs, with $\delta F \ll \Delta F$, the combination therewith of photoelectric transducer means comprising a pair of reflectors each positioned to receive a respective beam pair, each reflector having a parabolic curvature with a focus beyond the beam path, and further comprising a pair of photoelectric cells respectively associated with said reflectors, each cell having an envelope provided with an entrance window for the beam pair of the associated reflector, said window being spherically curved about the focus of said associated reflector, and with an electron-emissive receiving surface of spherical curvature confronting said window and centered on said focus, said cells being differentially connected in a common output circuit including means for electronically reproducting the beat frequency $\delta F$.

18. In a communication system including a source of composite radiation with at least one desired frequency and at least one undesired frequency, the combination therewith of radiation-channeling means forming a main path and a branch path with progressive relative phase shift for said frequencies between a first part of said radiation transmitted over said main path and a second part of said radiation transmitted over said branch path, the extent of said phase shift being such that the relative phasing of said undesired frequency differs by substantially $\pi$ from that of said desired frequency in said first and second parts at a predetermined junction of said paths, and circuit means at said junction for combining said parts with substantial cancellation of said undesired frequency.

19. The combination defined in claim 18 wherein said radiation includes a plurality of undesired frequencies, said radiation-channeling means including a wave guide with successive delay loops for eliminating different ones of said undesired frequencies.

20. The combination defined in claim 18 wherein said radiation-channeling means comprises a plurality of bandpass filters each with a pass band in the region of a respective undesired frequency to be eliminated, said radiation-channeling means further including a transmission line in shunt with said filters, said circuit means comprising a plurality of unidirectionally conductive devices each connected to said transmission line and to the output of a respective filter.

References Cited

UNITED STATES PATENTS

| | | | |
|---|---|---|---|
| 2,309,678 | 2/1943 | Smith | 325—47 |
| 2,408,692 | 11/1946 | Shore | 325—33 |
| 2,530,081 | 11/1950 | Ross | 329—128 |
| 2,557,038 | 6/1951 | Ross | 329—128 |
| 2,762,871 | 9/1956 | Dicke | 330—4 |
| 3,055,258 | 9/1962 | Hurvitz | 250—199 |
| 3,134,840 | 5/1964 | Gamo | 250—199 |
| 3,175,088 | 3/1965 | Herriott | 332—3 |
| 3,187,251 | 6/1965 | Bell | 332—7.51 |
| 3,196,274 | 7/1965 | Giordmaine | 250—199 |
| 3,310,677 | 3/1967 | Pierce | 250—199 |

ROBERT L. GRIFFIN, *Primary Examiner.*

ALBERT J. MAYER, *Assistant Examiner.*

U.S. Cl. X.R.

332—7.51